United States Patent [19]
Shiflett et al.

[11] Patent Number: 5,729,644
[45] Date of Patent: Mar. 17, 1998

[54] RECEPTACLE FOR MULTI-FIBER CONNECTOR

[75] Inventors: Elbert O. Shiflett, Simpsonville, S.C.; James M. Wittes, Bernardsville, N.J.

[73] Assignee: Alcoa Fujikura Limited, Brentwood, Tenn.

[21] Appl. No.: 607,062

[22] Filed: Feb. 26, 1996

[51] Int. Cl.$^6$ .................................................. G02B 6/38
[52] U.S. Cl. ...................... 385/59; 385/60; 385/89; 385/92
[58] Field of Search ........................ 385/59, 60, 62, 385/65, 71, 72, 83, 88, 89, 92

[56] References Cited

U.S. PATENT DOCUMENTS

| 5,047,835 | 9/1991 | Chang | 385/92 |
| 5,117,476 | 5/1992 | Yingst et al. | 385/88 |
| 5,151,961 | 9/1992 | Hvezda et al. | 385/60 |
| 5,274,723 | 12/1993 | Komatsu | 385/92 |
| 5,333,225 | 7/1994 | Jacobowitz et al. | 385/93 |
| 5,361,318 | 11/1994 | Go et al. | 385/92 |
| 5,548,677 | 8/1996 | Kakii et al. | 385/92 |

Primary Examiner—Rodney B. Bovernick
Assistant Examiner—Hemang Sanghavi
Attorney, Agent, or Firm—Tracey D. Beiriger

[57] ABSTRACT

A multi-fiber receptacle that aligns and mates an MT or similar multi-fiber ferrule of a connector to an active device or to a lightguide means. The receptacle contains a lower chamber that houses a lightguide means that may be provided on a circuit board containing electronic components needing connection to the outside world via optical means. Above the lower chamber, the receptacle has an upper chamber which receives a connector employing a multi-fiber ferrule. The receptacle and connector are designed such that when the connector is received by the upper chamber, the ferrule fits into the lower chamber and is automatically aligned and mated with the lightguide means. Further, the receptacle and connector can be keyed in a manner that limits reception of a transmitter connector in a transmitter receptacle and a receiver connector in a receiver receptacle. The transmitter and receiver receptacles are preferably identical except for the keying feature.

4 Claims, 4 Drawing Sheets

# RECEPTACLE FOR MULTI-FIBER CONNECTOR

BACKGROUND OF THE INVENTION

1. Field of the Invention

This invention pertains to an optical transceiver receptacle for connecting a connector to an optical transmitting or receiving device. The optical transceiver receptacle can be mounted directly on a circuit booard or operate as a stand alone module. In either case, the subject receptacle can be used with a connector employing a multi-fiber ferrule such as Mechanical Transfer (MT) ferrule or similar type ferrule, which is the subject of a U.S. patent application being filed concurrently herewith entitled "Multi-Fiber Optical Connector" and assigned to a common assignee.

2. Technology Review

In lightwave communications, an optical transmitting device such as a laser or a light emitting diode (LED) is connected to an optical fiber by either directly butting the fiber to the active device, using lens or mirror systems that capture the light being transferred, or by using an intermediate lightguide mechanism to collect the light from the active device and guide it to the fiber and take the light from the fiber and guide it to the receiving device. In instances where a multi-fiber connector is used and the active device is configured in an array containing many such devices side by side, an intermediate lightguide means is typically used to align and mate the active devices to a connector installed at the end of the optic fiber cable. The active devices may be either light emitting means or light receiving means. Lightguide means, as used herein, is typically a block of plastic or glass material provided with minute holes or light pipes extending through the block for conducting light from one end of the block to the other. The minute holes or light pipes of the lightguide means align with the optical fibers of the connector.

To couple the lightguide means to the connector and to the active device, an optical receptacle can be used. The receptacle houses the lightguide means and receives a ferrule of a connector to align with the lightguide means. However, a receptacle does not exist that can beneficially receive one of the most commonly used multi-fiber connector ferrules; namely, the Mechanical Transfer (MT) ferrule. The MT ferrule is a multi-fiber device typically used to align fiber-to-fiber interfaces during mass termination. Aligning connectors employing such ferrules with lightguide means or active devices is difficult because of the close tolerances required.

It is, therefore, desirable to provide a receptacle that can receive, align and couple an MT or similar multi-fiber ferrule and a lightguide means or an active optical device.

It is a general objective of the present invention to provide a receptacle that receives and aligns an MT or similar multi-fiber ferrule with another multi-fiber object.

It is another objective of the invention to provide a receptacle that has a connector alignment feature that predispositions an MT or similar multi-fiber ferrule and another multi-fiber object.

It is yet another objective of the present invention to provide a receptacle that may easily mount onto and be securely attached to a circuit board or be used as a stand alone module.

A further objective of the invention is to provide a receptacle which does not require lens or mirroring systems for aligning optical fibers with active devices or waveguide.

SUMMARY OF THE INVENTION

The invention is directed to a multi-fiber receptacle that aligns and mates an MT or similar multi-fiber ferrule of a connector to an active device or a lightguide means. The receptacle contains a lower chamber that houses a lightguide means that may be provided on a circuit board containing electronic components needing connection to the outside world via optical means. Above the lower chamber, the receptacle has an upper chamber which receives a connector employing a ferrule. The receptacle and connector are designed such that when the connector is received by the upper chamber, the ferrule fits into the lower chamber and is automatically aligned and mated with the lightguide means. Further, the receptacle and connector can be keyed in a manner that limits reception of a transmitter connector in a transmitter receptacle and a receiver connector in a receiver receptacle. Preferably, the transmitter and receiver receptacles are identical except for the keying feature.

The receptacle may have a means to be secured to a circuit board or may be used as a stand alone module. The receptacle can be provided with integral pegs or legs that mate with a circuit board which has a means (openings) for receiving such pegs.

BRIEF DESCRIPTION OF THE DRAWINGS

The advantages, nature and additional features of the invention will become more apparent from the following description, taken in connection with the accompanying drawings in which.

DETAILED DESCRIPTION OF PREFERRED EMBODIMENTS

Figures 1A, 1B:
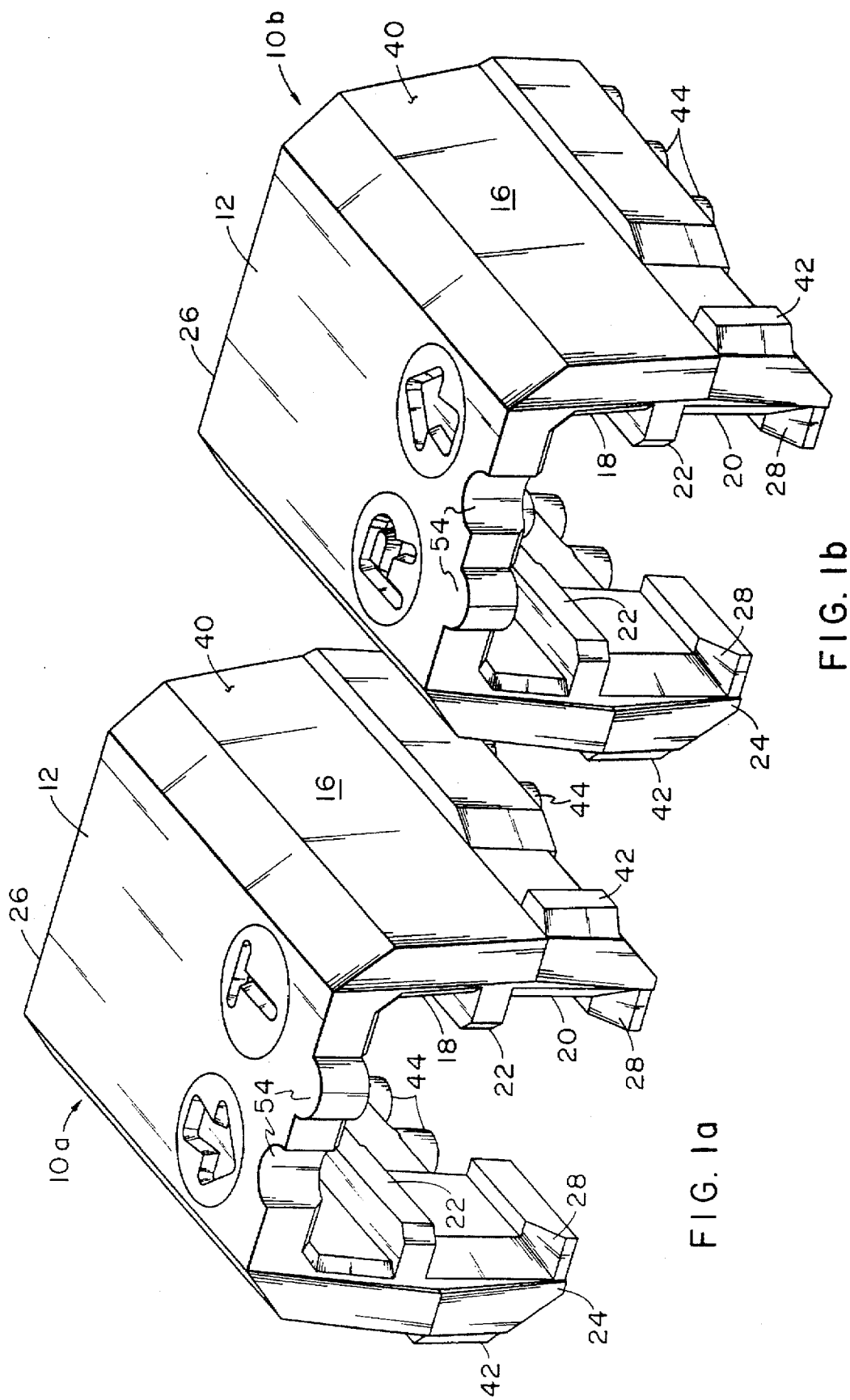
FIG. 1a is a perspective view of the transmitter receptacle of the present invention.
FIG. 1b is a perspective view of the receiver receptacle of the present invention.

Referring to Figs. 1a and 1b, a transmitter receptacle 10a and a receiver receptacle 10b respectively of the present invention are shown. The transmitter receptacle 10a and the receiver receptacle 10b will be generally denoted herein as receptacle 10 where the features and elements of 10a and 10b are the same. Except for keying means 54 shown on the transmitter receptacle 10a and the receiver receptacle 10b, the receptacles are identical.

Figure 2:
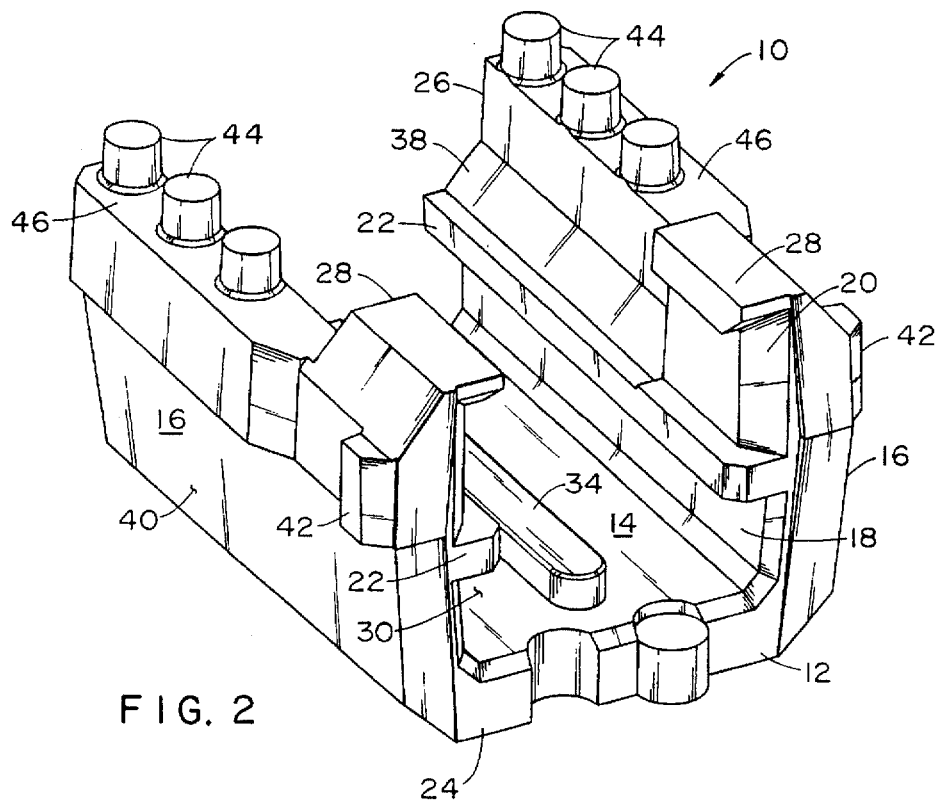
FIG. 2 is a perspective view of the underside of the receptacle of the present invention.

As shown in FIG. 2, the receptacle 10 has a generally C-shaped body 12 including a center wall 14 joining a pair of parallel side walls 16 extending from longitudinal edges of the center wall. Center wall 14 and the side walls 16 enclose an upper chamber 18 and partially enclose a lower chamber 20. The two chambers are formed by longitudinally extending rails 22 located in a mid-region of the side walls on inwardly-facing surfaces thereof. Rails 22 form a lower ledge for the upper chamber 18 and an upper ledge for lower chamber 20. Receptacle 10, in addition, has a front end 24 and a rear end 26. Near front end 24, a portion 28 of the side walls 16 turns inwardly to provide a smooth transition without sharp edges.

Center wall 14 has an inner planar surface 30 that provides the upper chamber with an upper surface, hereinafter referred to by numeral 30. An upper longitudinal rail 34 extends along the upper surface 30 of the upper chamber 18 from the front end 24 to near the rear end 26 of receptacle 10. The lower chamber 20 is depicted as having a somewhat complex inner surface 38 of the side walls 16. The surface 38 is configured to receive and hold a lightguide means 48 (FIG. 3) having an outer surface (not shown) corresponding to the inner surface 38 of the side walls 16.

Figure 3:
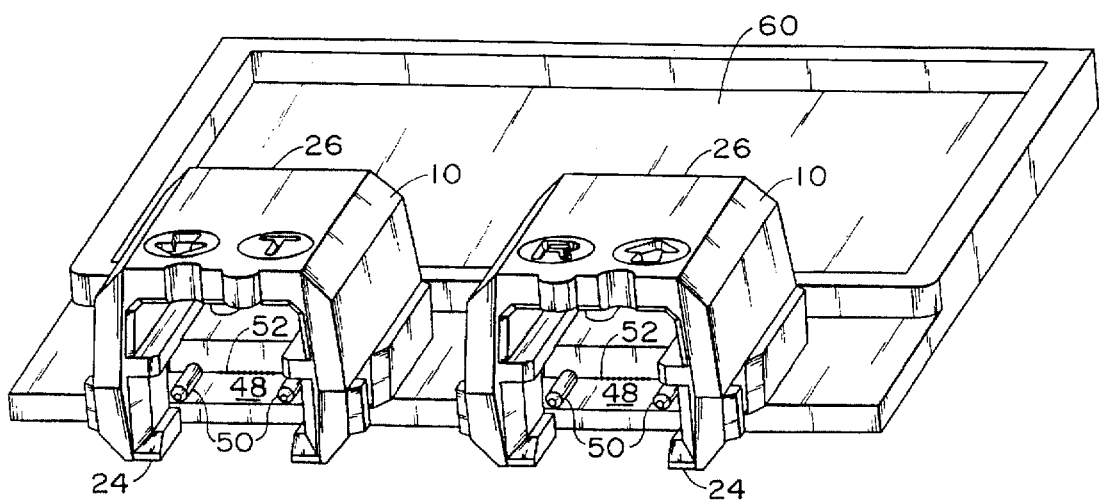
FIG. 3 shows a front elevation view of the transmitter receptacle and the receiver receptacle mounted onto a circuit board.
Figure 4:
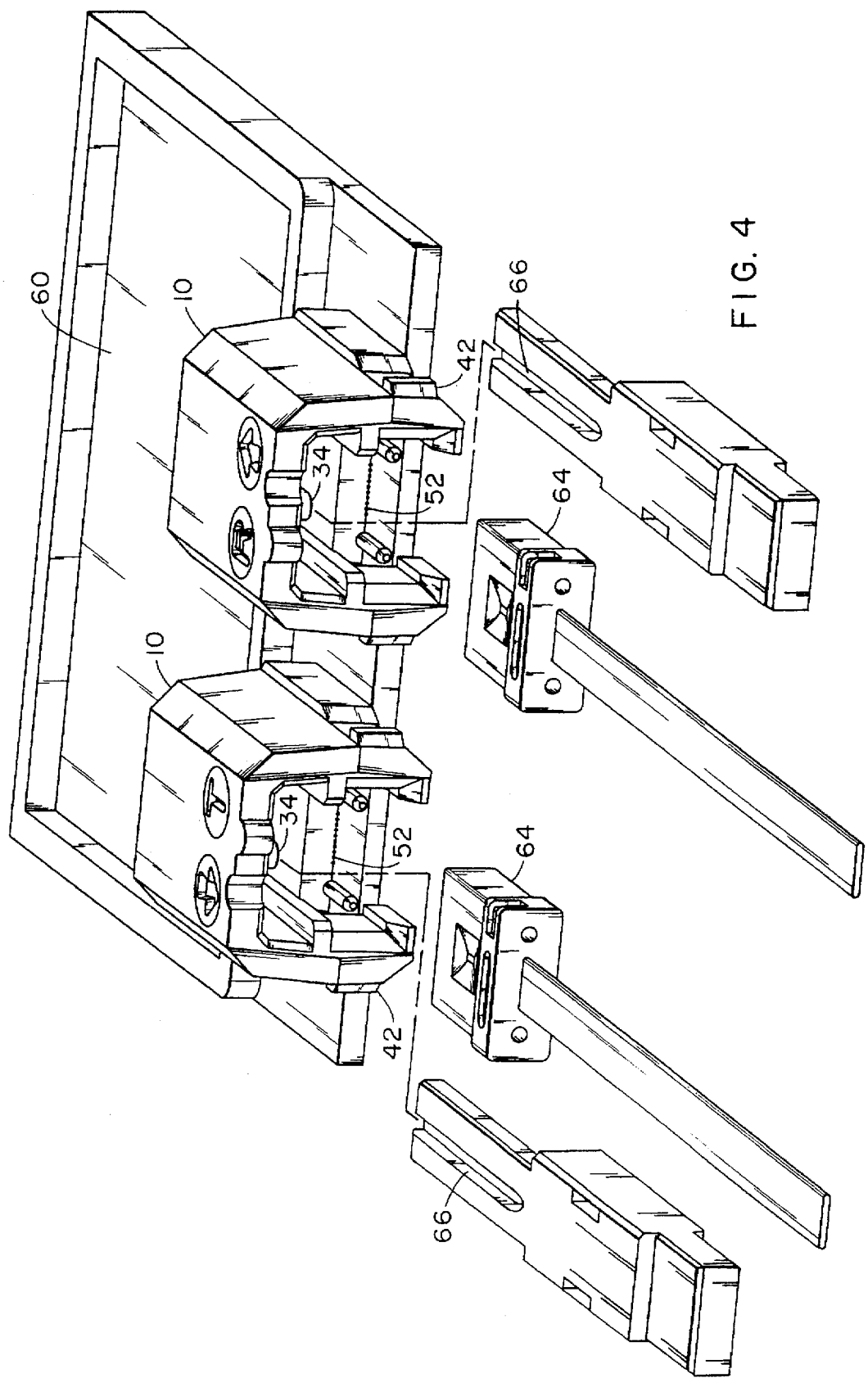
FIG. 4 is an exploded plan view showing the MT ferrule, the transmitter receptacle and the receiver receptacle mounted onto a circuit board.

The lower chamber 20 houses the lightguide means 48, as shown in FIG. 3. The outer surface of the lightguide means corresponds to the size and configuration of the inner surface 38 of the side walls 16 of the lower chamber. This permits mating of the receptacle 10 and the lightguide means 48. Further, the lightguide means can be preassembled and positioned in the lower chamber of the receptacle before mounting the receptacle on a circuit board 60 (FIG. 4).

Figure 5:
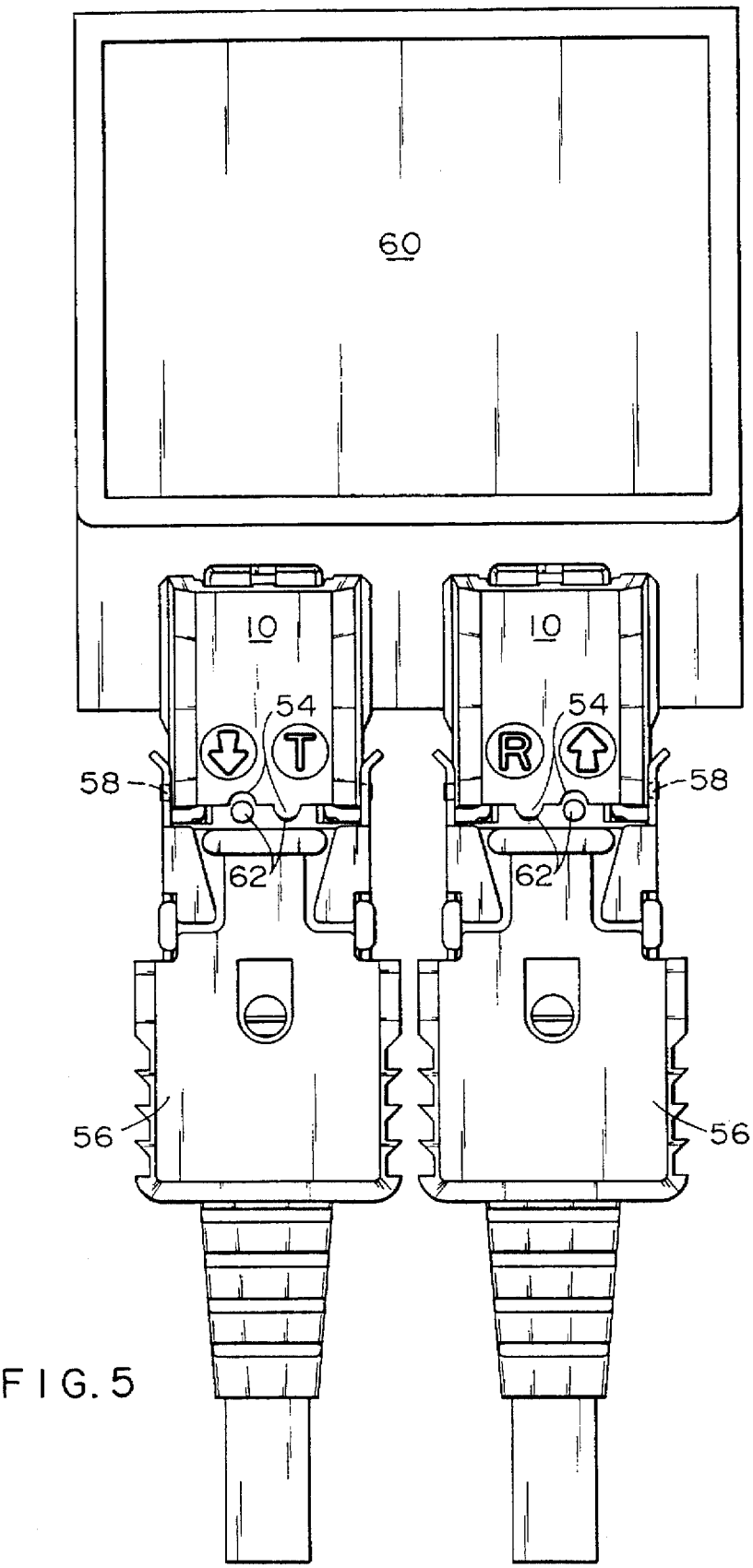
FIG. 5 is a plan view of the transmitter receptacle and receiver receptacles mating and aligning lightguide means and connectors.

The lightguide means 48 is located near the rear end 26 of receptacle 10 such that the portion of the lower chamber 20 near the front end 24 of the receptacle can receive a ferrule 64 (FIG. 4) of a connector 56 (FIG. 5). Guide pins 50 of the lightguide means 48 mate with openings (not shown) on the ferrule 64 of the connector to aid in the alignment of the lightguide material 52 and optical fibers (not shown) carded by the connector 56 (FIG. 5). At the rear end 26 of the receptacle 10, a transmitting device such as a laser or a receiving device such as a receiver diode (not shown) is connected to the lightguide material 52 of the lightguide means 48.

Upper chamber 18 of receptacle 10 receives a portion of a connector 56 (FIG. 5) which enters the chamber from front end 24 of the receptacle 10. Corresponding keying means 62 on the connector (FIG. 5) prevents the transmitter connector from plugging into the receiver receptacle and the receiver connector from plugging into the transmitter receptacle. The receptacle keying means 54 and the corresponding connector keying means 62 act as a safety measure in that users are warned as to the direction the light is traveling. Connector 56 has an integral groove 66 (see FIG. 4) for receiving upper rail 34 when the connector is inserted into receptacle 10. Upper rail 34 stops short of the rear end 26 of the receptacle. When the connector 56 is inserted into receptacle 10, the ferrule 64 enters the lower chamber 20, as discussed above.

The outer surfaces 40 of the side walls 16 can be provided with projections 42 (FIG. 2) to secure notches 58 of connector 56 (FIG. 5) to the receptacle 10. Other means for securing the connector 56 to the receptacle 10 can be used.

Further, receptacle 10, as shown, is provided with a plurality of legs or pegs 44 (FIG. 2) located along bottom edges 46 of the side walls 16. These are used to secure the receptacle onto a circuit board 60 (FIG. 4) that has apertures for receiving the legs (not visible in FIG. 4) in snug fit. Other means such as riveting, welding or gluing may be used or a screw receptacle may be provided to secure the receptacle to a circuit board. Although the receptacle may be mounted directly onto a circuit board 60 as shown in FIG. 4, it is also possible to use the receptacle as a stand alone module.

Receptacle 10 can be entirely injection molded into a unitary structure from a plastic material that will withstand a wave solder process. Other materials such as glass-filled thermoplastic may also be used.

Further, the receptacle can be used to align and mate various multi-fiber objects with minor modifications to the inside surfaces of the chambers. In some instances, a ferrule may have guide pins inserted into its apertures so that it can mate with a second multi-fiber object having apertures for receiving such guide pins.

FIGS. 3, 4 and 5 all depict a receiver receptacle and a transmitter receptacle simultaneously mounted to a circuit board. In some instances, there may be a need for only one of these receptacles. It is not intended for the invention to include only the simultaneous use of the two receptacles but to also include the sole use of either the receiver receptacle or the transmitter receptacle.

Having described the presently preferred embodiments, it is to be understood that the invention may be otherwise embodied within the scope of the appended claims.

What is claimed is:

1. A receptacle for aligning and mating a multi-fiber lightguide means and a connector, said connector having an upper surface having a groove and said connector containing a multi-fiber ferrule having apertures, said receptacle comprising:

a front end and a rear end;

an upper chamber for receiving a portion of said connector, said upper chamber having a top surface provided with a longitudinal rail extending from the front end to near the rear end of the receptacle for mating with said groove when said connector is inserted into said receptacle such that the ferrule of said connector is aligned with said lightguide means; and a lower chamber for housing said lightguide means and for receiving the ferrule of said connector in a position opposite said lightguide means, said lightguide means having a pair of guide pins for insertion into corresponding said apertures of the ferrule such that said lightguide means and said ferrule are properly aligned.

2. A receptacle for aligning and mating a multi-fiber lightguide means and a connector, said connector containing a multi-fiber ferrule having apertures, said receptacle comprising:

a front end and a rear end;

an upper chamber for receiving a portion of said connector; and a lower chamber for housing said lightguide means and for receiving the ferrule of said connector in a position opposite said lightguide means, said lightguide means having a pair of guide pins for insertion into corresponding said apertures of the ferrule such that said lightguide means and said ferrule are properly aligned, wherein said receptacle and said connector are provided with keying means, said keying means identifying said receptacle as a transmitter receptacle or a receiver receptacle and said connector as a transmitter connector or a receiver connector such that a transmitter connector can only be received by a transmitter receptacle and a receiver connector can only be received by a receiver receptacle.

3. A receptacle for aligning and mating a multi-fiber connector and a multi-fiber lightguide means, said receptacle having:

a front end and a rear end;

a generally C-shaped body including a center wall and an integral pair of side walls extending in a generally parallel fashion from longitudinal edges of said center wall, said center wall and side walls providing upper and lower chambers created by an integral, longitudinally extending rail positioned generally in a mid-region of each side wall so as to separate said upper and lower chambers;

said rails forming a lower ledge for said upper chamber and an upper ledge for said lower chamber;

said center wall having an inner surface that forms an upper surface in said upper chamber having a longitudinal upper rail extending from the front end to near the rear end of the receptacle;

said connector having an upper surface provided with an integral groove for receiving said upper rail when the connector is inserted into said upper chamber; and said lower chamber having peripheral surfaces for mating with surfaces of said lightguide means and adapted to receive a portion of said connector to align and mate with said lightguide means.

4. A receptacle for aligning and mating a multi-fiber lightguide means and a connector, said connector having an upper surface having a groove and said connector containing a multi-fiber ferrule having apertures, said receptacle comprising:

a front end and a rear end;

an upper chamber for receiving a portion of said connector, said upper chamber having a top surface provided with a longitudinal rail extending from the front end to near the rear end of the receptacle for mating with said groove when said connector is inserted into said receptacle such that the ferrule of said connector is aligned with said lightguide means; and a lower chamber for housing said lightguide means and for receiving the ferrule of said connector in a position opposite said lightguide means, said lightguide means having a pair of guide pins for insertion into corresponding said apertures of the ferrule such that said lightguide means and said ferrule are properly aligned, wherein said receptacle and said connector are provided with keying means, said keying means identifying said receptacle as a transmitter receptacle or a receiver receptacle and said connector as a transmitter connector or a receiver connector such that a transmitter connector can only be received by a transmitter receptacle and a receiver connector can only be received by a receiver receptacle.

* * * * *